H. HANSTEIN.
KNIFE CONSTRUCTION.
APPLICATION FILED NOV. 14, 1917.
1,270,727.
Patented June 25, 1918.
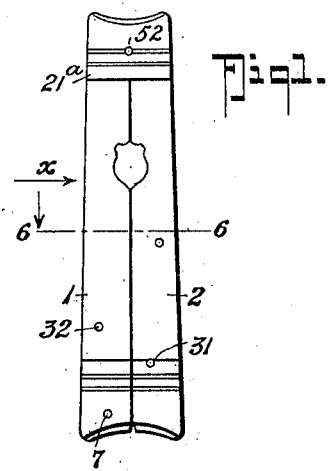
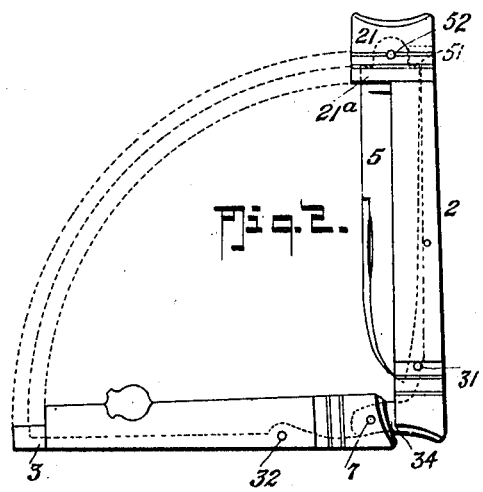
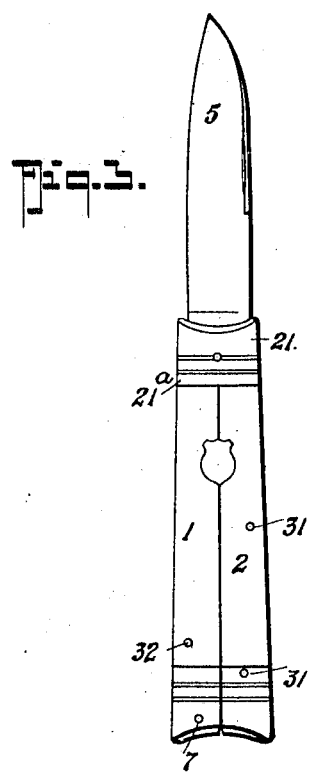
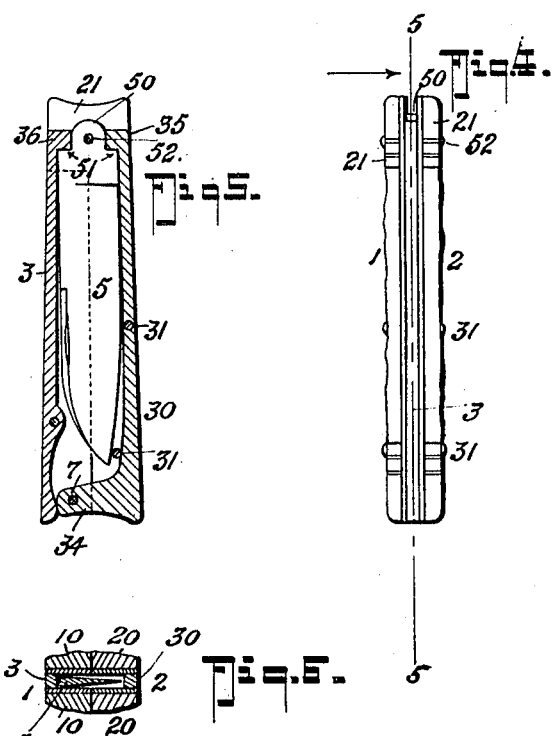
INVENTOR
Henry Hanstein
BY
Fred G. Dieterich & Co.
ATTORNEYS

UNITED STATES PATENT OFFICE.

HENRY HANSTEIN, OF POUGHKEEPSIE, NEW YORK.

KNIFE CONSTRUCTION.

1,270,727.  Specification of Letters Patent.  Patented June 25, 1918.

Application filed November 14, 1917. Serial No. 202,002.

*To all whom it may concern:*

Be it known that I, HENRY HANSTEIN, a citizen of the United States, residing at Poughkeepsie, in the county of Dutchess, State of New York, have invented certain new and useful Improvements in Knife Construction, of which the following is a specification.

My invention primarily has for its purpose to provide a new and improved construction of pocket knife and it more particularly has reference to that type of pocket knives in which provision is made for so incasing the blade or blades, when shut, that they may be the more conveniently and safely carried in the pocket and rendered dirt and dust proof.

My invention embodies, in a knife of the general character stated, certain improved features of construction including an improved arrangement of the blade holding casing to adapt the same for holding the blade, so that, when closed, it is impossible to come into contact therewith, and an improved arrangement of spring members that hold the casing or blade covering members secure in their closed position and the blade positively locked to its open position, that danger of the blade accidentally closing onto the hand or fingers of the user, as is possible in the use of the ordinary fitted knife blades, is entirely overcome.

With other objects in view that will hereinafter appear, my invention consists in certain features of construction and novel combination of parts, all of which will be described in detail, specifically pointed out in the appended claims and illustrated in the accompanying drawings, in which:

Figure 1 is a side elevation of my improved construction of pocket knife, the parts being at their closed position.

Fig. 2 is a similar view, one half of the blade casing being shown swung down to permit movement of the blade to the open position.

Fig. 3 is a view similar to Figs. 1 and 2, the casing members being shown closed to form a complete handle and the blade opened out ready for use.

Fig. 4 is an end view of the closed knife, looking in the direction of the arrow $x$ on Fig. 1.

Fig. 5 is a vertical section thereof, parts being in elevation and taken substantially on the line 5—5 on Fig. 1.

Fig. 6 is a horizontal section taken on the line 6—6 on Fig. 1.

In the drawings, I have illustrated a development of my invention in the nature of an ordinary pocket knife but I desire it understood my invention may be readily adapted for providing an improved hunting knife or table forks, combs, and such other articles that include a casing and an upper spring hinged to fold into the casing when not in use.

In carrying out my invention, I make the casing or handle portion of my improved knife construction of two half sections 1 and 2 of substantially like construction, each consisting of a body member composed of a pair of oppositely disposed side portions, as is best shown in Figs. 5 and 6, by reference to which it will be seen the portions 10—10 of the half section 1 are attached, by rivets 32, to a front edge spring 3 and the portions 20—20 of the other half casing section 2 are attached to the back edge spring 30 by rivets 31—31.

At the upper end, the back casing or handle portions 20—20 have vertical extensions 21—21, each formed with a forwardly extended member 21ᵃ that projects over and forms a closure for the upper ends of the front handle or casing portions 10—10, when the latter are at their closed position, as is clearly shown in Figs. 3 and 4.

The upper extensions 21—21 of the members 20—20 also serve as a cap or receptacle for the butt or hinged end of the blade 5 which, in my construction, as shown, includes a hinged portion 50 apertured for the hinge rivet 52 and located centrally between a pair of oppositely projected locking shoulders 51—51 at the blade butt. The hinged rivet 52 takes through the opposite cap-like extensions to firmly secure the upper handle or casing member and the blade together.

In the construction shown, the hinged member, the blade, is of somewhat less length than the hollow handle or casing so that the lower end thereof clears the bottom portion of the back spring 30 and, in practice, the size of the blade, the spring 30 and the hinged connection of the handle are relatively such that when the blade is shut up, as in Figs. 2, 5 and 6, the locking lug 35 of the said back spring 30 so engages the adjacent locking shoulder on the blade that the knife edge is held from striking or bearing solid against the said back spring, as shown.

The front part of the hollow handle or casing is hinged at its lower end to the lower end of the back half in the manner best shown in Fig. 2 which illustrates the lower end of the back spring 30, which spring is firmly attached to the lower end of the said back section (by rivets 31), terminates in a forwardly projected substantially right angled member 34 that extends between the opposite side portion of the front handle or casing member, engages the inner face of the lower end of the front edge spring 3 and is hinged to the said casing member by a rivet 7.

By reason of pivotally joining the two half handle sections at their lower end in the manner shown and described, provision is made for a tight spring snap closure of the two parts when the front section is swung up, on the lines indicated in Fig. 2, to the fully closed position, as shown in Figs. 1 and 3.

It will be noticed from the drawings that the upper front edge of the spring 30 extends beyond the upper end of the side members 10—10 and has a locking lug 36 that engages with either of the locking shoulders in the blade butt, when the blade is in the bent or closed position.

In the finished product, all of the corners or edges of the different parts of the hollow handle or casing are sufficiently rounded off to prevent tearing the pockets in which the article may be carried.

From the foregoing description taken in connection with the drawings, my improved knife construction and the advantages thereof will be readily apparent.

When open and in use with the front handle section closed, the blade will be stationary and immovable, therefore, the danger of the blade closing back, as in the ordinary pocket knife, is done away with and since one-half of the handle must be opened before the blade can be moved out or turned back, the handle or casing is, under either adjustment of the blade, closed against the collection of dirt or dust therein.

The arrangement of the back and the front edge springs is such that the blade can be opened or closed easier than is usual with the ordinary types of knife blades, as the springs, by reason of the arrangement shown, need not be so strong as is usually required in the conventional types of pocket knives.

In the claims, the term blade is intended to include not only a cutting implement, as shown, but any other that for convenience or safety may be hingedly connected to the casing or handle structure and for being extended therefrom or inclosed within the handle or casing portions.

What I claim is:

1. An implement holder, comprising two substantially alike half sections, one a relatively fixed section and the other an opposing half section, means for pivoting an implement in one end of the said relatively fixed half section, said end having provision whereby the said implement may be located in either an extended or in a closed position, the said relatively fixed half section having a longitudinal recess to receive the said implement when the same is in the closed position, means for hinging the other or opposing half section to that end of the relatively fixed half section which is opposite the end to which the implement is hinged, the said hinged half section also having a recess whereby, when said half sections are closed together, the same will incase said implement, when such implement is in the closed position, the said implement having a shouldered butt at the hinged end, and resilient latch elements carried by the half members and coöperative with the shouldered butt for retaining the implement either in the extended or inclosed positions.

2. An implement holder, comprising two substantially alike half sections, one a relatively fixed section and the other an opposing half section, means for pivoting an implement in one end of the said relatively fixed half section, said end having provision whereby the said implement may be located in either an extended or a closed position, the said relatively fixed half section having a longitudinal recess to receive the said implement when the same is in the closed position, means for hinging the other or opposing half section to that end of the relatively fixed half section which is opposite the end to which the implement is hinged, the said hinged half section also having a recess whereby, when said half sections are closed together, the same will incase said implement, when such implement is in the closed position, the said implement having a shouldered butt at the hinged end and resilient latch elements carried by the half members and coöperative with the shouldered butt for retaining the implement either in the extended or inclosed positions, and a cam latch connection between said half sections for holding the said sections together or separated according to the position of the hinged half section.

3. A blade holder comprising a relatively fixed half section, and an opposing half section, each of the said sections being composed of oppositely disposed members and a resilient spring held between the respective said members along one edge thereof, a blade pivotally mounted at one end of and between the opposite members of the said relatively fixed section to close down into the said relatively fixed section, the pivoted end of the blade having a stop shoulder at each side of its pivot, the said opposing half section being hingedly connected to that end of the relatively fixedly held section opposite the end in which the blade is pivoted, said resilient springs having locking lugs at one end that coöperate with the stop shoulders on the pivoted end of the blade and one of the said springs including a lateral extension at its lower end that engages with the lower end of the other spring.

HENRY HANSTEIN.

Copies of this patent may be obtained for five cents each, by addressing the "Commissioner of Patents, Washington, D. C."